Figure 1:
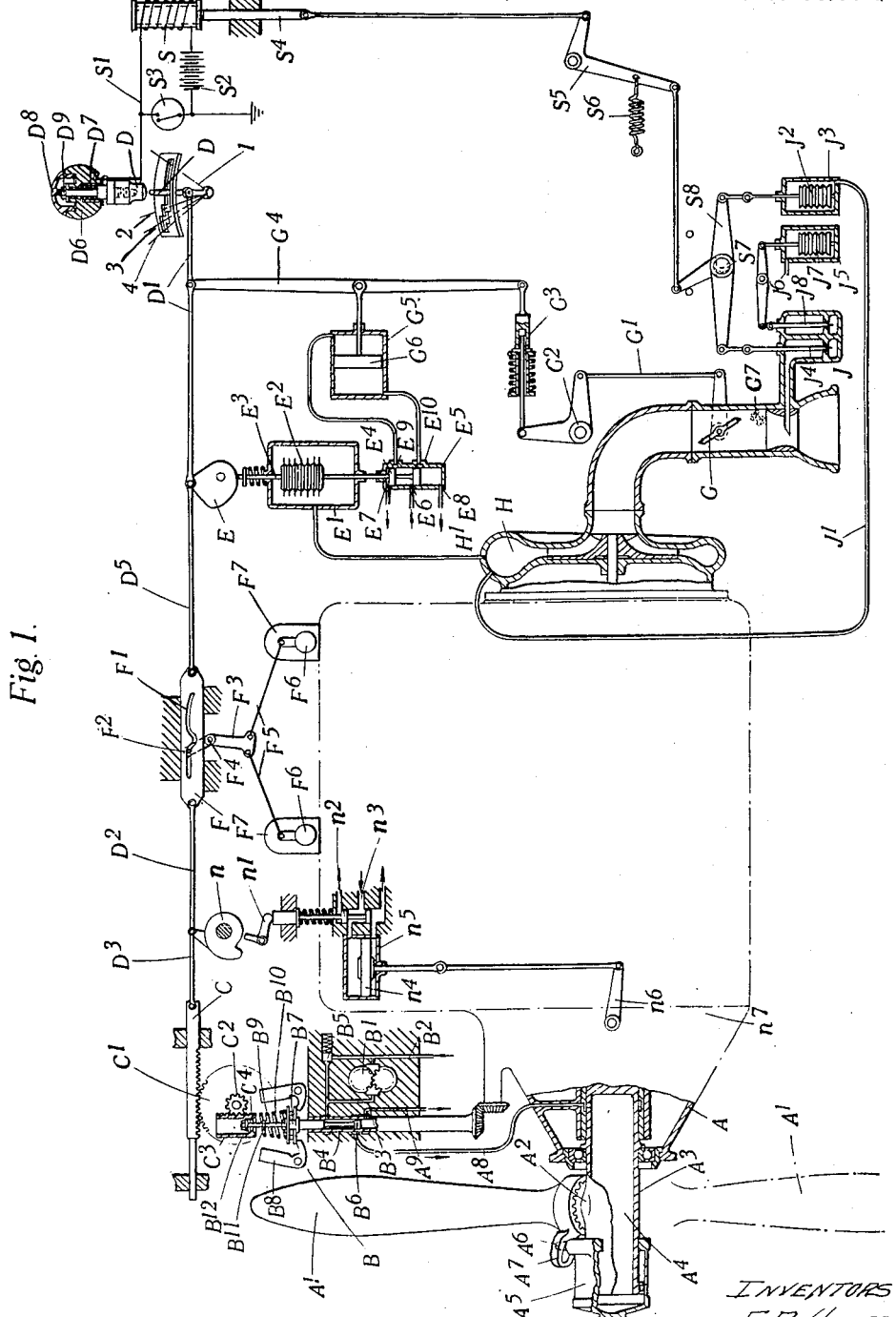

Oct. 8, 1940.　　　F. B. HALFORD ET AL　　　2,217,364
CONTROL SYSTEM FOR THE POWER UNITS OF AIRCRAFT
Filed Nov. 4, 1936　　　5 Sheets-Sheet 1

INVENTORS.
F. B. Halford
& E. S. Moult
BY
ATTYS.

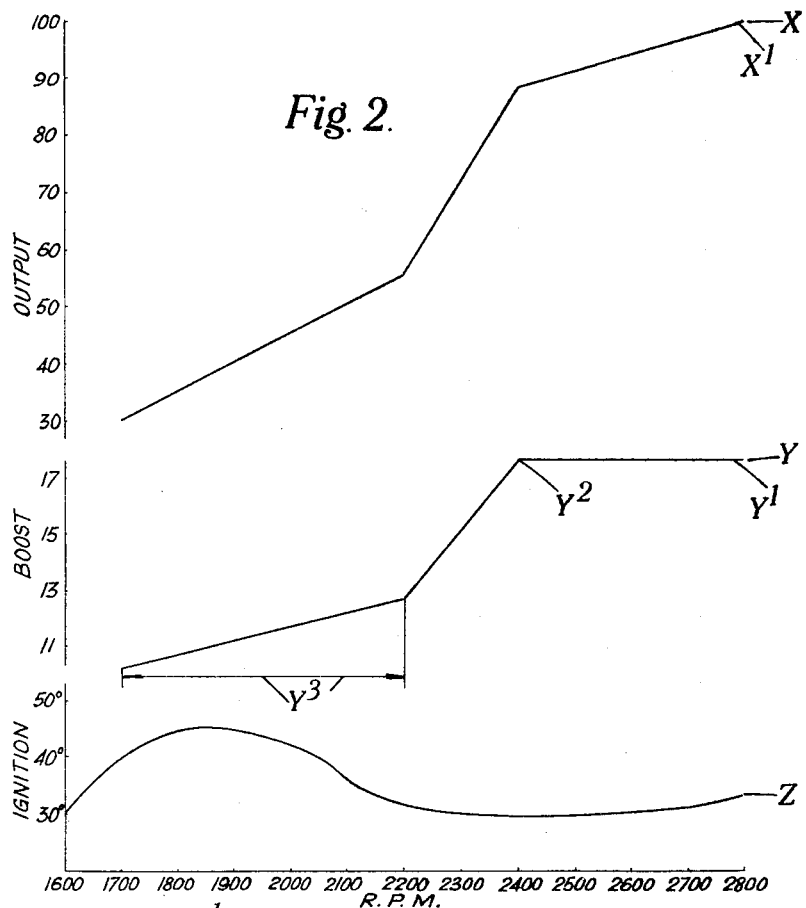
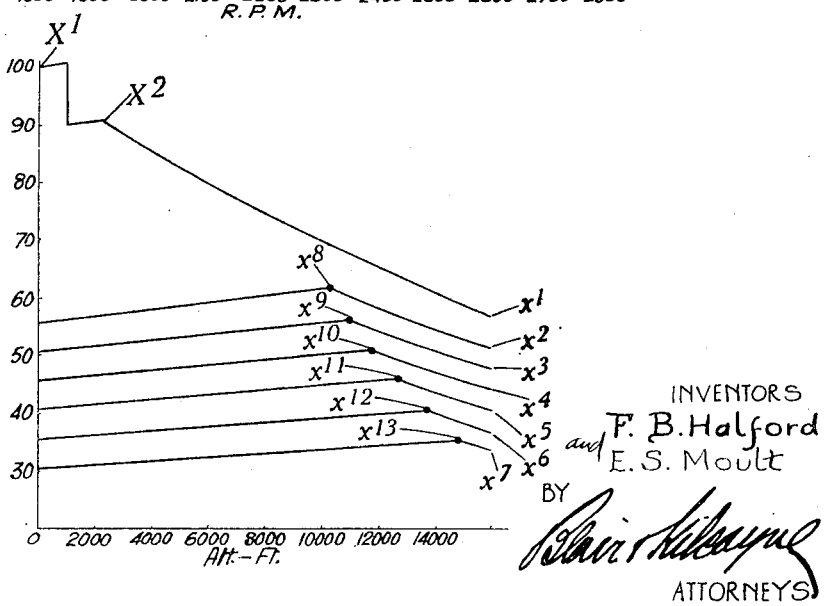

Patented Oct. 8, 1940

2,217,364

UNITED STATES PATENT OFFICE 2,217,364

CONTROL SYSTEM FOR THE POWER UNITS OF AIRCRAFT

Frank Bernard Halford and Eric Stanley Moult, London, England

Application November 4, 1936, Serial No. 109,186
In Great Britain November 12, 1935

15 Claims. (Cl. 170—135.6)

This invention relates to control systems for the power units of aircraft and of the kind comprising an internal combustion engine and a variable pitch airscrew whose pitch is automatically controlled by a governor driven by the engine.

With an airscrew of fixed pitch the airscrew speed is both a measure and a limitation of the power absorbed, engine speed regulation being effected by manual or automatic control of a throttle or the like so that power output settles itself in accordance with altitude and the airscrew characteristics. Though a variable pitch airscrew facilitates control by the pilot of the engine output, automatic governor control of the pitch allows freedom of choice of the engine speed irrespective of the throttle opening so that airscrew speed is no indication of the power output. Since therefore the power output of a given engine depends upon the product of its speed of revolution and the brake mean effective pressure, the pilot is only able to estimate the engine output by correlating observations of the engine speed, induction pressure and altitude.

Economic engine operation, with independent speed and throttle control as heretofore employed, is open to the disadvantage that, apart from necessitating reading by the pilot of charts or tables, the test upon which such charts or tables are based is usually made under maximum conditions, that is to say when the engine is supercharged or "boosted" the tests for climbing and cruising are usually conducted with the appropriate maximum declared boost and maximum declared engine speed applied simultaneously. If therefore the maximum boost pressure is used at lower engine speeds durability of the engine may be adversely affected. Thus, there is nothing to prevent the pilot from flying at low engine speed and high boost pressure, with a resultant risk that reliability of the engine will be impaired due to detonation. Similarly, it is possible with independent control, for example in an emergency when maximum engine speed and boost pressure are temporarily required, for the pilot first to raise the boost pressure without at the same time correspondingly increasing the engine speed with consequent risk of detonation. In order to guard against abuse of this nature precautions have hitherto had to be taken which necessarily reduced the maximum available engine output.

The present invention has for its object not only to overcome the above difficulties but also to simplify the operation and installation of the control mechanism and at the same time improve its sensitivity.

In a control system according to the present invention, the airscrew pitch and a factor or factors which determine the mean effective pressure of the engine are influenced by one and the same master control device under the control of the pilot. Thus, the mean effective pressure cannot be modified without at the same time correspondingly altering the engine speed, so that risk of detonation, due for example, in a supercharged engine, to maximum boost pressure being employed at a low engine speed, is reduced.

Preferably the governor controlling the airscrew pitch, and a device controlling the boost pressure are connected to the master control device so that for any given increase or decrease of engine speed, above the minimum cruising speed range, a corresponding increase or decrease of the boost pressure is automatically effected. The most suitable compromise of boost pressure and engine speed for reliability and economy may thus be determined during manufacture, safe and reliable operation of the engine being ensured whatever the load factor selected by the pilot.

Preferably movement of the master control device by the pilot from the normal or starting position through a preliminary stage towards increase of the engine input does not affect the boost pressure control device or the governor controlling the airscrew pitch, whilst continued movement of the master control device influences the boost pressure control device to increase the boost pressure with a simultaneous increase in the engine speed, yet further movement of the master control device through a second stage influencing the boost pressure control device to increase the boost pressure with a simultaneous but relatively small increase in engine speed, movement of the master control through a third stage causing the engine speed to be increased with simultaneous, but relatively small, increase or possibly a decrease of the boost pressure.

Though a supercharger or booster will serve approximately to maintain sea level power up to a critical altitude, there is a serious risk of detonation taking place if the input regulating device is fully opened at or near ground level. With a view to guarding against this difficulty a boost control device is usually provided comprising a closed chamber subject to the boost pressure and containing a collapsible element in the form of a bellows or a stack of collapsible capsules, one end of the bellows or stack being connected to a valve controlling a servo piston for influencing the device (e. g. throttle) controlling the input to the engine, whilst the other end of the bellows is connected to an adjustment stud or, in the case of a boost control of the "variable datum" type, to a plunger or rod operatively connected to the pilot's control whereby the pilot adjusts the input of the engine. Thus, with the variable datum boost control, any given adjustment of the pilot's control results in a definite alteration in the boost pressure and maximum permissible boost pressure cannot be obtained, below the critical altitude, until the said lever has been moved to the fully "open" position.

When the present invention is applied to a power unit of the type above indicated and the boost control device is of the variable datum type, the master control device may be so connected to the boost control device and pitch governor that, for any given setting of the master control device, the resultant power output conforms approximately to the constant speed line on a conventional engine performance curve. Thus, for example, for any given setting of the pitch governor and boost control device below the critical altitude sea level power would be increased approximately at the rate of 1.1% per 1000 feet while, above the critical altitude, power would decrease for any given engine speed.

As will be appreciated this result differs from that obtained for any given boost pressure with a fixed pitch airscrew since the engine speed and output obtainable are then largely governed by the characteristics of the airscrew. Further, since with the present invention engine speeds will be automatically increased with boost pressure at all altitudes, the response to a variation of the engine input, e. g. throttle opening, at moderate altitudes would be somewhat more marked than with independent control systems as hitherto employed since, with the latter, for a given setting of the boost control device, the sea level power curve flattens as maximum speeds are approached so that at high speeds the ratio of power increase to increase of engine speed tends to be low, or the power may even decrease with increase in the speed.

When the engine of a power unit to which the invention is applied is of the vapourised charge spark ignition type the master control device may also influence a member for regulating the timing of the ignition. The arrangement is then preferably such that as the master control device is moved by the pilot from the "closed" or starting position the timing of the ignition is advanced rapidly until the cruising speed range is reached during which the rate of ignition advance decreases with increasing speed, the timing being thereafter retarded as the speed increases within the climbing speed range until, for high, e. g. take-off, speeds, the timing remains substantially constant or is slightly advanced with increasing speed.

The timing of the ignition is primarily a function of engine speed and the pressure on the induction side of the engine. Since therefore control of the engine speed and the boost pressure are co-related with the ignition timing by reason of the common or master control device, automatic regulation of the ignition timing, as by means of a governor, is rendered unnecessary.

A device may be provided for controlling the mixture strength of the charge, and this device connected to the master control device. The interconnection between the master control device and the mixture control device may be such that, as the master control device is moved to increase the input to the engine the mixture is enriched for starting and slow running speeds and is then weakened for cruising speeds. As the speed increases the mixture is enriched, progressively, as climbing and emergency speeds are attained. This result may be obtained, for example, by causing the degree of opening of an air control valve or the like to be retarded as the master control device is actuated by the pilot to increase the engine output, e. g. to increase the effective opening of the throttle.

In the accompanying drawings—

Figure 4:
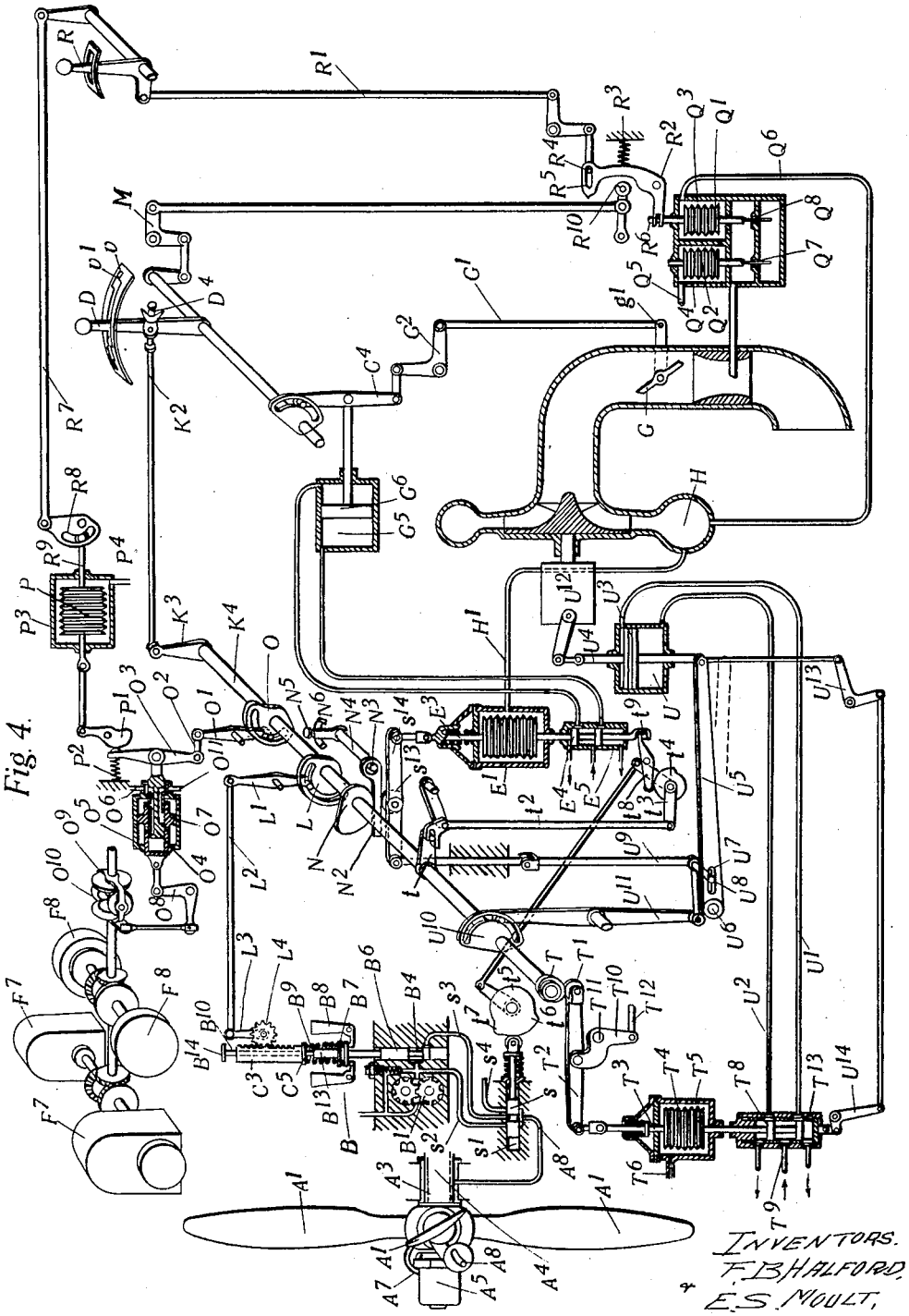
Figure 5:
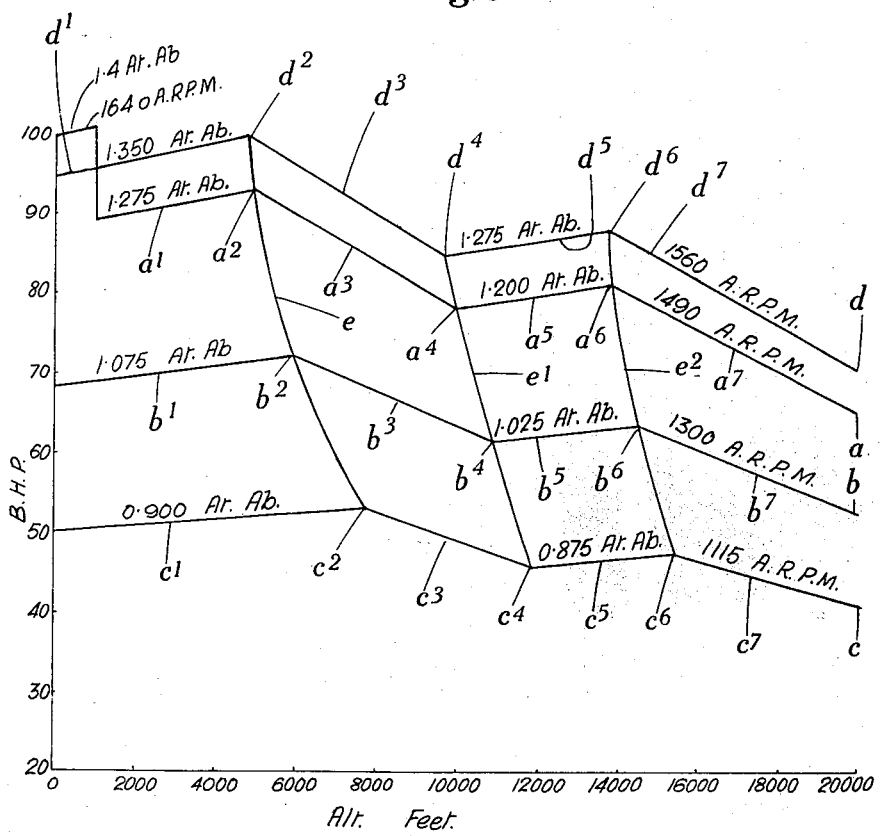
Figure 6:
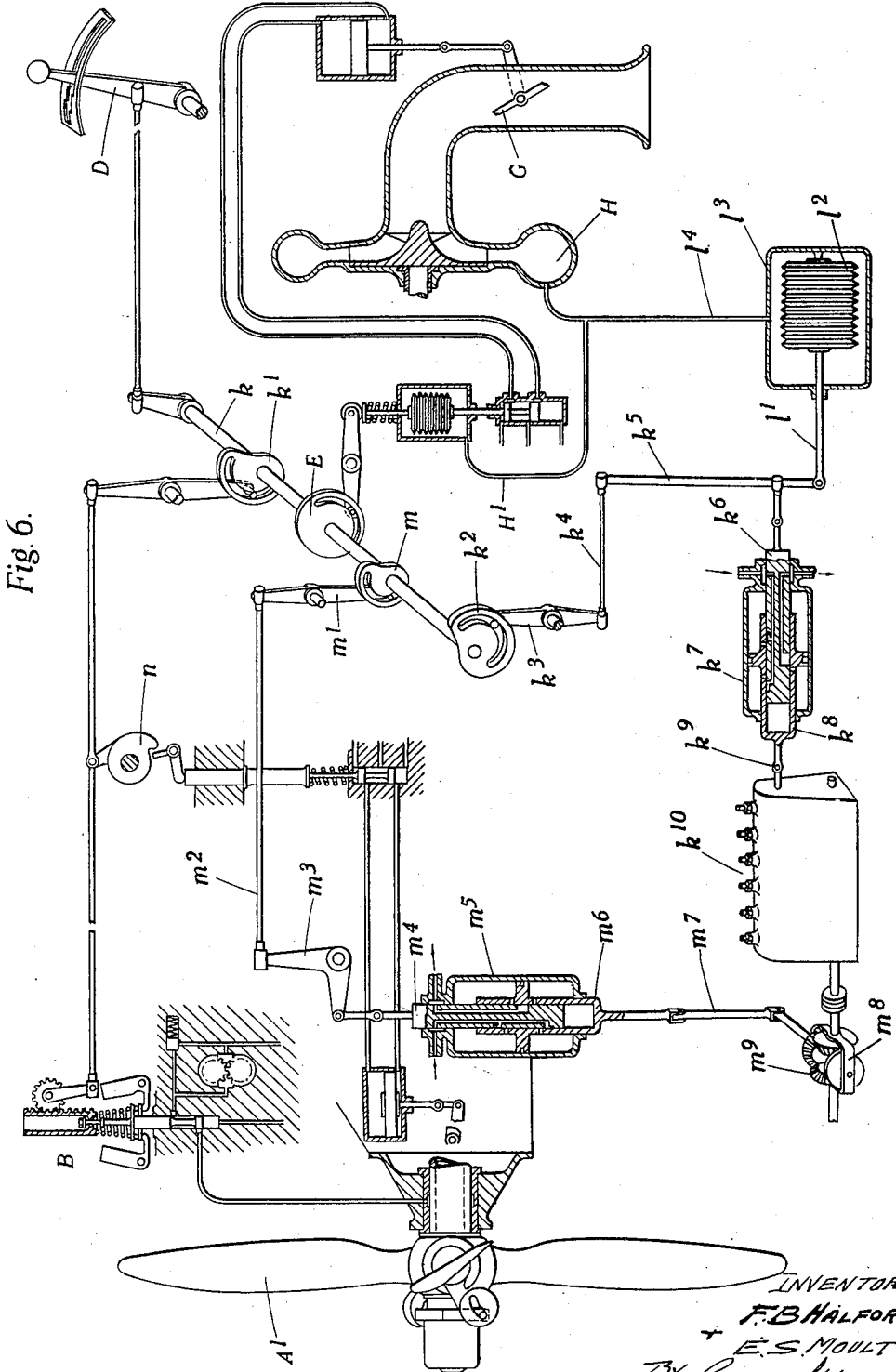

Figure 1 illustrates one arrangement embodying the invention,

Figures 2 and 3 are curves indicating variations in power output, boost pressure and ignition timing, at various altitudes and engine speeds, with the arrangement shown in Figure 1, Figure 4 shows a preferred arrangement, embodying the invention, Figure 5 indicates, by means of curves, the variations in power output and boost pressure obtained at several engine speeds and altitudes with the control apparatus shown in Figure 4, Figure 6 shows a further arrangement, also according to the invention, but in which the engine is of the fuel injection compression ignition type.

It should be understood that various constructions shown in the drawings are not only given by way of example but are, for the most part, illustrated purely diagrammatically.

In the arrangement shown in Figure 1, the pitch of the airscrew blades $A^1$ is automatically controlled by a governor B so that the said pitch is automatically modified in accordance with variations in the speed of the engine indicated at A. To this end each blade $A^1$ is rotatable about a spider arm $A^2$ attached to the airscrew shaft $A^3$. The shaft $A^3$ has an internal chamber $A^4$ and is furnished with a cylindrical cap $A^5$ which is longitudinally movable on the shaft $A^3$ under hydraulic pressure supplied to the chamber $A^4$ as hereinafter described. The cap $A^5$ has two studs $A^6$ which engage slots in lugs $A^7$ carried by the blades $A^1$. When the airscrew is in operation centrifugal and aerodynamic forces tend to turn the blades $A^1$ into coarse or maximum pitch against the said hydraulic pressure.

The governor generally indicated at B comprises a pump $B^1$ driven by the engine and to which oil is delivered under the engine oil pressure, say 50 lbs. per square inch, through a pipe $B^2$, the pump $B^1$ delivering this oil, say at a pressure of 200 lbs. per square inch, through a pipe $B^3$ to a cylinder $B^4$. A by-pass valve $B^5$ determines the maximum pressure on the delivery side of the pump $B^1$ by automatically returning oil from the pipe $B^3$ to the pipe $B^2$ when the said maximum oil pressure is exceeded. The cylinder $B^4$ contains a piston valve $B^6$ which is controlled by a member $B^7$ actuated by governor fly weights $B^8$ driven by the engine. The member $B^7$ is loaded by a spring $B^9$ and carries a spindle $B^{10}$ furnished with two collars $B^{11}$ and $B^{12}$. The valve $B^6$ controls the supply of oil under pressure from the cylinder $B^4$ through a pipe $A^8$ to the chamber $A^4$ and the discharge of oil from the latter through the pipe $A^8$ to a pipe $A^9$ and thence back to the engine.

The effective tension of the loading spring $B^9$ can be adjusted by a sleeve $C^3$ actuated by a gear wheel $C^2$ carried by a larger gear wheel $C^1$ which is operated by a rack C, hereinafter referred to as the speed control device. Extreme upward movement of the sleeve $C^3$ causes a flange $C^4$ thereon to engage the collar $B^{12}$ thus positively holding the valve $B^6$ up to give coarse pitch of the airscrew $A^1$ since the valve $B^6$ is then held raised so as to bring the pipe $A^8$ into communication with the pipe $A^9$. Conversely, extreme downward movement of the sleeve $C^3$ causes the flange $C^4$ to engage the collar $B^{11}$ and thus positively hold the valve $B^6$ downwards to give fine airscrew pitch. Under steady flying conditions the fly weights $B^8$ are held in equilibrium by the tension of the spring $B^9$ acting against the centrifugal force, variations in engine speed causing adjustment of the valve $B^6$ and thus effecting variation of the airscrew pitch to tend to maintain the engine speed substantially constant.

The speed control C is connected by a pivoted link $D^3$ to a cam $n$ which controls a change-speed gear between the engine and the airscrew, the cam $n$ being connected by a pivoted link $D^2$ to an ignition control device F which is connected by another pivoted link $D^5$ to a boost control cam E. The boost control cam E is connected by two links $D^1$ to a master control device comprising a lever D under the pilot's control and hereinafter referred to as the pilot's lever.

It is known that with certain high speed types of machine the airscrew blades are liable to be stalled at "take-off" if the take-off speed is too closely related to the maximum level flight speed. It is therefore desirable to provide for high airscrew speeds during "take-off" in order that the blades shall be unstalled and the maximum thrust developed. In the constructions above described this has been achieved by allowing the engine to "overspeed" while developing its "take-off" power.

With some types of engine, however, this overspeeding may give rise to detonation or destructive mechanical forces and in such cases a change-speed gear may be provided between the engine and the airscrew. In the arrangement shown the cam $n$ acts through a bell crank lever $n^1$ on a spring-loaded piston valve $n^2$. The valve $n^2$ controls a supply of oil under pressure through a pipe $n^3$ to opposite sides of the servo piston $n^4$ arranged in a servo cylinder $n^5$. The servo piston $n^4$ is connected, as shown, to a member $n^6$ for controlling the ratio of the change-speed gear through which the drive is transmitted to the airscrew $A^1$.

The ignition control device F is constituted by a plate cam comprising a cam slot $F^1$ engaged by a follower $F^2$ carried on one arm of a bell crank lever $F^3$ pivoted at $F^4$. The other arm of the lever $F^3$ is connected through links $F^5$ to the contact-breakers $F^6$ of the magnetos $F^7$. The basic timing of the magnetos is controlled in the known manner by a governor or governors (not shown) driven by the engine, supplementary ignition timing being effected by the device F, as hereinafter described.

The boost control device is of the variable datum type and comprises a chamber $E^1$ containing a stack of evacuated capsules $E^2$. One end of the stack $E^2$ carries a spindle $E^3$ which passes through a gland in the head of the chamber $E^1$ and is biased upwards by a spring, the boost control cam E acting on the end of the spindle $E^3$. The lower end of the stack $E^2$ acts on a piston valve $E^4$ arranged in a cylinder $E^5$ furnished with five ports, namely, an inlet port $E^6$ for oil under pressure, two discharge ports $E^7$ and $E^8$, a port $E^9$ leading to a servo cylinder $G^5$ on one side of a servo piston $G^6$, and a port $E^{10}$ leading to the servo cylinder $G^5$ on the other side of the piston $G^6$. The chamber $E^1$ is in permanent communication through a pipe $H^1$ with the induction pipe of the engine A, to which air is supplied by a supercharger or booster H driven by the engine, the boost control cam E being moved by the pilot's lever D so that a definite boost pressure is provided for each position of the lever D within the operating range.

The carburettor J is of the type whereby the air/fuel mixture strength is automatically controlled. To this end the boost pressure acts through a pipe $J^1$ on a stack of evacuated capsules $J^2$ arranged in a closed chamber $J^3$ so as to raise a needle $J^4$ and enrich the mixture with increasing boost pressure. A second chamber $J^5$, in permanent communication with the atmosphere through a port $J^6$, contains a stack of evacuated capsules $J^7$ which controls a needle $J^8$ so that with increasing altitude the fuel supplied to the carburettor J is reduced, as is necessary to correct for atmospheric density effects on the fuel/air ratio. The characteristics of the carburettor may be determined to suit requirements by initially adjusting the stacks of capsules $J^2$, $J^7$ or changing the carburettor jets and the needles $J^4$, $J^8$.

The datum of the mixture control capsules $J^2$ is arranged so that it can be altered by the pilot to vary within limits the range of mixture strengths.

Thus, although during short distance flying and manoeuvring a normally rich mixture setting can be employed, the pilot can set a weak mixture for economical cruising over long distances when he so desires. In this respect it should be understood that where extreme economy of engine operation is required mixture strength will be reduced to the maximum economy point. An engine running under these conditions is, however, somewhat susceptible to movement of the controls, that is to say the stability of operation of the engine and facility for manoeuvring are restricted if the carburettor is set for a permanently weak mixture in the cruising range. This difficulty is overcome by providing means whereby the mixture is temporarily enriched while the pilot's lever D is being adjusted.

In the arrangement shown the pilot's lever D is provided with a knob $D^6$ loaded by a spring $D^7$ and having a metallic contact $D^8$ for cooperation with a contact $D^9$ connected to earth through the lever D. The contact $D^8$ is electrically connected through a conductor $S^1$ and solenoid S to one terminal of an electric battery $S^2$ the other terminal of which is connected to earth, a manually controlled switch $S^3$ being provided between the conductor $S^1$ and the earthed side of the battery $S^2$.

When the pilot grasps the head $D^6$ of the lever D the weight of the pilot's hand closes the contacts $D^8$ and $D^9$ thereby energising the solenoid S. An armature $S^4$ is thus raised and a bell crank lever $S^5$ is turned in the counterclockwise direction as viewed in the drawing against the action of a spring $S^6$. This rotation of the bell crank lever $S^5$ turns an eccentric bush $S^7$ in the clockwise direction and raises the fulcrum of a lever $S^8$ connected at one end to the stack of capsules $J^2$ arranged within the chamber $J^3$ which communicates with the induction pipe of the engine. Thus, by raising the fulcrum point of the lever $S^8$ the needle $J^4$ is raised and the mixture strength is temporarily enriched. When the pilot releases the lever D the solenoid S is deenergised and the spring $S^6$ returns the fulcrum of the lever $S^8$ so that the mixture strength will now be as determined by the boost pressure. If the pilot desires to cruise over an appreciable length of time at a rich mixture strength he closes the switch $S^3$ so that the fulcrum of the lever $S^8$ is retained in its raised position even after the pilot has removed his hand from the lever D. A similar effect may be obtained by providing the knob $D^6$ with means cooperating with a latch on the body of the lever D so that the pilot can at will latch the knob $D^6$ in its downward position and thus retain the lever $S^8$ in its raised position.

The throttle G is controlled, through a link $G^1$, bell-crank lever $G^2$ and lost motion device $G^3$, from a lever $G^4$ connected to the pilot's lever D through the pivot of the links $D^1$, the rod of the servo piston $G^6$ being pivotally connected to the lever $G^4$. The maximum opening movement of the throttle G is determined by a stop $G^7$.

The lost motion device $G^3$ permits further movement of the pilot's lever D to increase the engine speed after the throttle G has been fully opened. For example, the boost pressure permissible at 2000 revolutions per minute corresponds to a fully open throttle at 12,000 feet altitude (see Figure 3). The throttle G is then against its stop $G^7$ so that if, while flying under these conditions, the pilot wishes to increase the engine speed, say, to 2200 or 2400 revolutions per minute, the pilot's lever D can be moved to effect the necessary alteration in the loading of the governor B, and therefore the necessary reduction in airscrew pitch, since the spring of the lost motion device $G^3$ will yield. It will be appreciated that the spring of the lost motion device $G^3$ is sufficiently stiff to act as a solid link except under the circumstances referred to above.

The operation of the control apparatus shown in Figure 1 is as follows.

With the lever D in the starting position indicated at 1 the flange $C^4$ on the sleeve $C^3$ positively holds the valve $B^6$ in its fully raised position, thereby setting coarse pitch of the airscrew $A^1$. Initial movement of the pilot's lever D from the starting position 1 acts through the links $D^1$, lever $G^4$ and bell-crank lever $G^2$ to increase the effective opening of the throttle G. The follower $F^2$ of the ignition control device $F^{11}$ is now in a straight part of the slot $F^1$, the spindle $E^3$ bears against a concentric part of the boost control cam E while the projection on the cam $n$ has not yet contacted with the bell crank lever $n^{1\prime\prime}$, so that neither the boost control device $E^1$ nor the ignition timing nor the change-speed gear between the engine and airscrew are as yet affected by the lever D. The valve $B^6$ is moved downwards but does not alter the aircrew pitch until the throttle G has been appreciably altered.

The engine is now started and warms up and gathers speed. With continued movement of the lever D the valve $B^6$ moves down until the pipe $A^8$ is brought into communication with the cylinder $B^4$ above the valve $B^6$ so that the pitch of the airscrew $A^1$ is reduced. The resultant increase in the engine speed however causes the governor B to raise the valve $B^6$, thus tending to maintain the constant aircrew pitch for a given position of the lever D. With continued movement of the pilot's lever D, however, the cam F advances the ignition timing over and above the basic advance effected by the ignition timing governor or governors. At the same time the boost control cam E commences to influence the boost control device $E^1$ whilst the loading of the governor B is increased. The engine speed at which the governor B will close the pipe $A^8$ is thus increased so that the engine tends to speed up. This influence commences somewhat below the minimum cruising speed, say, at 1600 revolutions per minute. The downward movement of the spindle $E^3$, in effect, alters the datum of the boost control device $E^1$, thereby tending to move the valve $E^4$ downwards to admit oil under pressure through the port $E^{10}$ to the servo cylinder $G_5$ on the left of the piston $G^6$, and to allow oil to be discharged from the cylinder $G^5$, on the right of the piston $G^6$, through the ports $E^9$ and $E^7$. The tendency therefore is for the piston $G^6$ to open the throttle G still further, but the rising engine speed and consequent increase in the induction pipe pressure tends to collapse the capsules $E^2$ and thus restore the valve $E^4$ to a central position of equilibrium.

Thus, for any given engine speed there is a corresponding boost pressure to give an output suitable for level flight conditions, the cruising power output increasing progressively as the pilot's lever is moved to increase the effective opening of the throttle G. The ignition control cam F rapidly advances the ignition up to the minimum cruising speed, say, 1700 engine revolutions per minute.

The law governing the most suitable ratio of engine speed to induction pressure at speeds above the minimum cruising speed will vary for different engines and can only be satisfactorily determined from a detailed knowledge of the engine characteristics. In principle, however, it may be desirable, at any given speed within the cruising speed range, to cruise at a determined fraction of the absolute induction pressure which, with the weakest fuel mixture and the minimum ignition advance for maximum power at that speed, results in signs of incipient detonation with the type of fuel selected.

As the engine speed increases within the cruising speed range, say 1700 revolutions per minute to 2200 revolutions per minute, advance of the ignition timing will continue to be progressive (as hereinafter described with reference to Figure 2) the rate of ignition advance being dependent on the power output selected for any given engine speed.

The pilot's lever D is now in the position indicated at 2, namely, at the end of the range of movement 1—2, hereinafter referred to as the "first stage" and corresponding to an engine speed range up to, say, 2200 revolutions per minute, that is to say, including the slow running, starting and cruising speed ranges.

During a "second stage" of movement of the pilot's lever D from the position 2 to the position 3, an increased power output is obtained for climbing and emergency conditions. To this end, the resulting movement of the throttle G and of the boost control cam E causes a marked increase in the boost pressure, but a relatively small increase in the engine speed. Thus, above the cruising speed range, say, from 2200 to 2400 revolutions per minute, the boost pressure increases rapidly and concurrently with increase of the airscrew speed until the output required, say, for climbing or emergency conditions in level flight, is attained. During the "second stage" 2—3 the cam F gradually retards the ignition, thereby permitting the use of high boost pressures without detonation which is further guarded against by automatic enrichment of the mixture strength due to the high boost pressure acting on the stack of capsules $J^2$ to raise the needle $J^4$ and admit more fuel. It will be appreciated that fuel consumption, under emergency and climbing conditions which are usually transitory, is of minor importance.

The pilot's lever D is now at the position 3, i. e. at the end of the "second stage." Movement of this lever from the position 3 towards the position 4, that is to say through a "third stage," gives the high airscrew speeds necessary for "taking-off." Movement of the pilot's lever through this third stage causes a considerable increase in the engine speed with a relatively small change in the boost pressure. Thus, for example, for engine speeds between 2400 and 2800 revolutions per minute, the curve indicating boost pressure, as shown in Figure 2, is substantially flat between 2400 and 2500 revolutions per minute.

Within the usual flying speed range the cam $n$ lies clear of the bell crank lever $n^1$ so that the valve $n^2$ is held in the position shown and the servo piston $n^4$ holds the member $n^6$ in the position shown, that is to say so that the two-speed gear $n^7$ is set for low airscrew speed, for example two-thirds of the engine crankshaft revolutions per minute. This low gear ratio is maintained for all positions of the pilot's lever D from low speed or starting through the cruising and climbing ranges. When, however, the pilot's lever is moved into the "third stage" for "take-off" the cam $n$ moves the valve $n^2$ downwards so that the oil under pressure is supplied to the cylinder $n^5$ below the piston $n^4$ which moves the member $n^6$ upwards into the high speed position in which, for example, the airscrew $A^1$ is driven at the same speed as the engine crankshaft. After the machine has taken off and the pilot throttles back to suit climbing conditions, the cam $n$ leaves the bell-crank lever $n^1$ and the change-speed gear $n^7$ is thereby changed back to the position shown, that is to say for low airscrew speed.

During the third stage of movement of the pilot's lever D the ignition control cam F leaves the ignition timing substantially unaltered though the ignition may be advanced slightly (as shown in Figure 2) relatively to the timing which obtains at the end of the emergency or climbing speed range, say, 2400 revolutions per minute.

When, say, at high altitudes, the throttle G is moved to its fully open position due to the piston $G^6$ being moved to the righthand end of the cylinder $G^5$, the engine sped can be still further increased by the pilot's lever D since the lost motion device $G^3$ will yield and thus permit the movement of the lever D to increase the loading of the spring $B^9$ and thus increase the engine speed.

For the second and third stages the pilot's lever has no central or intermediate position but is moved to the end of the stages of movement as determined by the gates in the cooperating quadrant. An appreciable lever movement is preferably provided so as to avoid undesirably steep operative surfaces on the cams E and F. In this respect the quadrant of the lever D has gates, as shown, so that the pilot will be aware of passing from the cruising speed range into the climbing and emergency speed range or from the latter into the take-off or "over-speed" range.

Figures 2 and 3 indicate, by means of curves, variations in the output at various altitudes and engine speeds of a power unit as described with reference to Figure 1. In Figure 2 engine revolutions per minute (within the flying speed range) are plotted as abscissae and the three curves X, Y and Z represent, respectively, variations of engine output at sea level in percentage of the take-off output, boost pressure in pounds per square inch absolute and ignition timing in degrees before top dead centre. In Figure 3 the seven curves $x^1$, $x^2$, $x^3$, $x^4$, $x^5$, $x^6$ and $x^7$ are plotted with altitudes in feet as abscissae and power outputs, in percentage of the take-off output, as ordinates.

From these curves it will be seen that with a take-off speed of 2800 revolutions per minute at sea level the boost pressure is approximately 17.7 pounds per square inch as shown at $Y^1$ on the curve Y, whilst the take-off output is approximately 100% as shown at $X^1$ on the curves X and $x^1$. At the maximum climbing speed of 2400 revolutions per minute and up to 2200 feet altitude the boost pressure of 17.7 pounds per square inch is maintained as shown at $Y^2$ on the curve Y, the power output being approximately 90% at 2200 feet as shown at $X^2$ on the curve $x^1$.

At the maximum cruising speed of 2200 revolutions per minute and up to 10,200 feet altitude the boost pressure is maintained approximately at 12.7 pounds per square inch whilst the power output at 10,200 feet is approximately 62% of the take-off power as shown at $x^8$ on the curve $x^2$. Similarly at 2100 revolutions per minute the boost pressure is maintained at approximately 12.2 pounds per square inch up to an altitude of 11,000 feet, the power output being then approximately 56% of the take-off power as shown at $x^9$ on the curve $x^3$, whilst at 2000 revolutions per minute the boost pressure is maintained at approximately 11.7 pounds per square inch up to, say, 11,700 feet altitude when the power output is approximately 52% of the take-off power as shown at the point $x^{10}$ on the curve $x^4$. At 1900 revolutions per minute the boost pressure is maintained at, say, 11.2 pounds per square inch up to an altitude of approximately 12,600 feet when the power output is in the region of 45% of the take-off power as shown at the point $x^{11}$ on the curve $x^5$, whilst at 1800 revolutions per minute the boost pressure is maintained at 10.7 pounds per square inch up to an altitude of approximately 13,700 feet when the power output is approximately 40% of the take-off power as shown at the point $x^{12}$ on the curve $x^6$. At the commencement of the cruising speed range, i. e. 1700 revolutions per minute, the boost pressure is maintained at approximately 10.2 pounds per square inch up to an altitude of, say, 15,000 feet when the power output is approximately 36% of the take-off power as shown at the point $x^{13}$ on the curve $x^7$.

The curve Z indicating variations in the ignition timing with variations in engine speed includes the flying range only, that is to say from 1600 revolutions per minute upwards. From this curve it will be seen that between 1600 revolutions per minute up to the commencement of the cruising speed range indicated at $Y^3$ the ignition timing is rapidly advanced up to 40° before top dead centre at 1700 revolutions per minute. With increasing speed within the cruising range $Y^3$ the advance in the ignition timing is still progressive but somewhat less rapid. As the speed increases within the cruising speed range beyond approximately 1800 revolutions per minute, the ignition timing is gradually retarded thereby permitting the use of the higher boost pressures, as indicated by the accompanying curve Y, without detonation which, it should be noted, is further guarded against by automatic enrichment of the mixture strength, the mixture strength characteristic being somewhat similar to the boost pressure curve Y. At speeds beyond the cruising speed range $Y^3$ the ignition timing is gradually retarded until for increasing engine speeds in the "third stage," that is to say from 2400 revolutions per minute upwards, when the boost pressure remains substantially constant, the ignition timing first remains approximately constant and is then slightly advanced.

It should be understood that from starting speeds up to those below the flying range, that is to say below 1600 revolutions per minute, the ignition timing is advanced from, say, 10° prior to top dead centre to 30° at 1600 revolutions per minute. This ignition advance gives slow running and freedom from backfire during the starting period. It will be understood that the control of the ignition timing effected by the pilot's lever D gives only the additional advance required, say, above 1600 revolutions per minute, the ignition timing being otherwise automatically controlled by the ignition governor or governors.

In the preferred arrangement illustrated in Figure 4 the airscrew $A^1$ and associated governor B cooperate in a manner similar to that described with reference to Figure 1. The sleeve $C^3$ is, however, modified so that on extreme downward movement a flange $C^5$ bears against a part $B^{13}$ of the spindle $B^{10}$ and the valve $B^6$ is positively held down and fine pitch of the airscrew $B^1$ maintained. On the other hand when the sleeve $C^3$ is moved to its extreme upward position the sleeve engages a head $B^{14}$ on the stem $B^{10}$ and thus positively holds the valve $B^6$ in a raised position so that the airscrew blades $A^1$ automatically return and remain in coarse pitch.

The pilot's lever D is connected by a rod $K^2$ and crank $K^3$ to a control shaft $K^4$ which carries a speed control cam L, a boost control cam N, an ignition control cam O and supercharger change-speed gear control cams $U^{10}$ and T. The cam L acts through a pivoted lever $L^1$ and link $L^2$ on a crank $L^3$ secured to a gear wheel $L^4$ which meshes with teeth on the sleeve $C^3$, the action of the gear wheel $L^4$ being similar to that described with respect to the gear wheel $C^2$ in Figure 1.

The boost control cam N acts through a pivoted arm $N^2$ on a tappet roller $s^{13}$ carried by a lever $s^{14}$ one end of which acts on the spindle $E^3$ so as to control the datum of the boost control device $E^2$ in a manner similar to that described with reference to Figure 1. The other end of the lever $s^{14}$ is carried in a manner which will be described hereinafter. The arm $N^2$ pivots about an eccentric bush $N^3$ carried by a shaft $N^4$ which is furnished with an adjustment lever $N^5$. By adjusting the lever $N^5$ over a quadrant $N^6$ small basic adjustments of the boost/speed relationship may be made at will to suit different fuels and different operating or atmospheric conditions.

The ignition control cam O acts through a rocking lever $O^1$ and link $O^2$ on a floating lever $O^3$. The floating lever $O^3$ is pivotally connected to a pilot valve $O^4$ arranged within a servo cylinder $O^5$ to which oil under pressure is supplied through a pipe $O^6$ and from which the oil is discharged through a pipe $O^{11}$. This arrangement constitutes a "copying" mechanism in which movement of the pilot valve $O^4$ to the left causes oil under pressure to be delivered from the pipe $O^6$ to the cylinder $O^5$ on the right of the piston $O^7$ which thus moves to the left, thereby tending to cut off the supply of oil to the right of the piston $O^7$ so that this is stopped in a new position of equilibrium. Conversely, movement of the valve $O^4$ to the right tends to cause the piston $O^7$ to take up a new position of equilibrium more to the right. The servo piston $O^7$ acts through a bell crank lever $O^8$ on a cage $O^9$ of the differential gear $O^{10}$ through which the magnetos $F^7$ are driven from the engine and thus advances or retards the magnetos $F^7$ and distributors $F^8$ relatively to the engine crankshaft. The upper end of the floating lever $O^3$ is held against a cam $P^1$ by a spring $P^2$, the cam being connected as shown to one end of a stack of evacuated capsules P arranged in a cylinder $P^3$ which communicates through a pipe $P^4$ with the delivery pipe of the supercharger H.

At constant boost pressure the capsules P do not affect the timing of the magnetos $F^7$ but with falling boost pressure, as for example at high altitudes, the capsules P expand and act through the cam $P^1$ so as to cause the floating lever $O^3$ to turn, in the clockwise direction as viewed in the drawings, about its lower end. The pilot valve $O^4$ is thus moved to the right and the servo piston $O^7$ thus moved to advance timing of the magnetos $F^7$. The capsules P thus tend to improve economy of operation by further advancing the ignition timing at altitudes above the "critical value", i. e. the altitude at which the boost pressure for the speed, as set by the lever D, commences to fall.

The carburettor Q comprises two stacks of evacuated capsules $Q^1$ and $Q^2$ arranged in chambers $Q^3$ and $Q^4$ respectively, the chamber $Q^4$ communicating through a pipe $Q^5$ with the atmosphere whilst the chamber $Q^3$ communicates with the delivery pipe of the supercharger H through a pipe $Q^6$. The stack of capsules $Q^2$ controls a needle $Q^7$ so as automatically to maintain the fuel/air mixture strength with increase in altitude, and the stack of capsules $Q^1$ controls a needle $Q^8$ the primary function of which is automatically to influence the mixture strength in accordance with the boost pressure.

An auxiliary hand lever R under the control of the pilot is connected through lever and link mechanism $R^1$ to a member $R^2$ which is biased to the left by a spring $R^3$ tending to maintain a pin $R^4$ in the righthand end of a slot $R^5$ formed in the member $R^2$. The member $R^2$ engages a spindle $R^6$ at the upper end of the stack of capsules $Q^1$. The lever R is also connected through a link $R^7$ to a cam $R^8$ which engages a pin carried by a spindle $R^9$ connected to one end of the stack of capsules P.

By operation of the lever R the datum of the mixture control capsules $Q^1$ is altered so as to vary, within limits, the range of mixture strengths which can be set by the carburettor Q. The member $R^2$ cooperates with a stop $R^{10}$ controlled by a bell crank lever M which is moved in accordance with the movement of the pilot's lever D so that when the pilot's lever is either at the beginning of the first stage or in the third stage the device $R^{10}$ will tend to engage the member $R^2$ and lift the spindle $R^6$ so as to enrich the mixture strength.

Thus, should the lever R be left in a position corresponding to a weak mixture strength, movement of the pilot's lever D into the starting position will ensure a rich mixture strength which is necessary for starting and slow running. Similarly at high outputs the device $R^{10}$ engages the member $R^2$ and ensures a rich mixture setting by the needle $Q^8$. The pilot can thus only adjust his mixture strength by means of the auxiliary lever R at speeds above slow running and below the maximum speed range.

With a view to simplifying the controls of a multiengine machine the several members $R^2$ associated with the different engines respectively may be interconnected so that all the engines are set simultaneously for rich or weak mixture.

The cam $R^8$ provides for a further economy by advancing the ignition when the auxiliary lever R is moved to weaken the mixture strength. Thus, when the auxiliary lever R is moved to the left as viewed in the drawings so as to weaken the mixture strength, the cam $R^8$ moves the spindle $R^9$ to the left and thus alters the datum of the control device $P^3$. The tendency therefore is for the floating lever $O^3$ to turn in the clockwise direction about its lower end so that the servo piston $O^7$ moves to the right and advances the ignition timing.

In order that engines of a multi-engined craft may be synchronised for revolution with one another it is desirable to provide a fine adjustment on each master control device so that a given position of each lever D corresponds to the required engine speed. To this end a nut $D^4$ is provided and permits a vernier adjustment of the lever D relatively to the link $K^2$, for synchronising the speeds of the several engines.

Though the control effected by the apparatus described with reference to Figure 4 is, in its essentials, similar to that effected by the construction described with reference to Figures 1, 2 and 3, it should be noted that in Figure 4 the control movement transmitted from the pilot's lever D to the governor B are non-linear. Further, the ignition control device $O^5$ provides the power for adjusting the timing of the magnetos $F^7$ and distributors $F^8$, thus relieving the control mechanism of undue load, the stack of capsules P giving the additional ignition control necessary for economy with falling boost pressures at high altitudes. Again, the regulation available by means of the auxiliary lever R provides the pilot with control over the mixture strength in the cruising range, but protects the engine at high outputs and when operating at low speeds.

Under certain conditions such, for example, as "dive-bombing," or to overcome difficulties which may be associated with slow-running or acceleration, it may be desirable to provide means for over-riding the normal action of the pitch governor or automatic boost pressure control. Further, failure of one engine in a multi-engine machine may require that the airscrew blades of the corresponding airscrew be turned into coarsest pitch in order that the drag of the "dead" airscrew shall be reduced to a minimum. Lastly, in the event of failure of the boost control capsule, it may be desirable to overrun the normal throttle quadrant and achieve direct operation of the carburettor throttle.

One arrangement is shown for meeting the above conditions in which a control valve s is arranged in a cylinder $s^1$ so as to control the flow of oil under pressure between the pipe $A^8$ and pipes $s^2$, $s^3$ and $s^4$. The pipe $s^2$ leads directly from the delivery side of the pump $B^1$, whilst the pipe $s^3$ leads from the cylinder $B^4$ to the cylinder $s^1$, the pipe $s^4$ leading from the latter cylinder to an outlet port or a return pipe leading back to the engine.

The pilot's lever D operates a lever $t$ carried on the shaft $K^4$ which acts on the upper end of a link $t^2$ connected to a bell crank lever $t^3$ carrying a cam $t^4$, the bell crank lever $t^3$ being also connected to a cam $t^5$ furnished with two protuberances $t^6$ and $t^7$, and acting on the piston valve s which is spring-loaded as shown. The cam $t^4$ co-operates with a rocking lever $t^8$ one end of which lies in a U-shaped part $t^9$ formed at the lower end of the piston valve $E^4$.

For all positions of the pilot's lever D corresponding to normal flying, the piston valve $s$ is maintained by the cam $t^5$ in a position in which the pipe $s^3$ is maintained in communication with the pipe $A^8$ so that there is direct communication between the cylinder $B^4$ and the chamber $A^4$ of the airscrew $A^1$. At low engine speeds or on other occasions when fine airscrew pitch is required irrespective of the governor control, the pilot's lever D turns the cam $t^5$ in an anti-clockwise direction, as viewed in the drawings, so that the protuberance $t^7$ moves the valve s to the left, thereby bringing the pipe $s^2$ into communication with the pipe $A^8$. The delivery side of the pump $B^1$ is thus in direct communication with the chamber $A^4$ so that a fine airscrew pitch is positively ensured and is maintained independently of the action of the pitch governor B. In the case of emergency when positive coarse pitch is required, the cam $t^5$ is moved still further in the anti-clockwise direction, as hereinafter described, so that the valve s is moved by its spring to the right as viewed in the drawings, thereby bringing the pipe $A^8$ into communication with the discharge pipe $s^4$. The chamber $A^4$ is thus drained and coarse pitch of the airscrew is obtained and maintained independently of the action of the governor B.

For all positions of the pilot's lever D corresponding to normal flying conditions, the lever $t^8$ is in the position shown so that it does not affect the operation of the piston valve $E^4$ by the boost control device $E^1$. When, however, the pilot's lever D is drawn back to a position at or near that corresponding to "closed throttle" position, where instability of the boost control may be experienced, the cam $t^4$ turns the lever $t^8$ in the clockwise direction, thus positively drawing down the piston valve $E^4$ so as to cause the piston $G^6$ to be moved to the righthand end of the cylinder $G^5$, thereby tending to open the throttle G. The piston $G^6$ is held in this position irrespective of the action of the boost control device $E^1$.

With a view to providing the necessary over-ride above referred to, the quadrant of the pilot's lever D is provided with an extension $v$ which is normally closed by a frangible seal or wire $v^1$. Thus, to obtain the emergency over-ride, the pilot's lever is drawn back from the starting position (see I in Figure 1) so that the lever D breaks the wire $v^1$ and rotates both cams $t^4$ and $t^5$ in the anti-clockwise direction so that the piston $G^6$ is moved to the righthand end of the cylinder $G^5$ whilst at the same time the valve s rides over the protuberance $t^7$ so that the valve s is moved to the right and brings the pipe $A^8$ into communication with the discharge pipe $s^4$. In this way the normal operation of the boost control device $E^1$ is over-ridden whilst a coarse pitch of the airscrew is obtained and will be maintained independently of the action of the governor B.

This extra movement of the pilot's lever D, after breaking the seal $v^1$ causes the lever $t$ to become disengaged from the upper end of the link $t^2$ so that forward movement of the pilot's lever D to tend to increase the speed will have no influence either on the airscrew pitch or on the boost control device. In this respect it will be understood that the loading spring of the piston valve s accompanied by the formation of the cam $t^5$ assists in locking the mechanism in the "over-ride" position after the seal $v^1$ has been broken. If desired, an extension normally closed by a frangible seal, may be arranged at the forward end of the quadrant associated with the pilot's lever D so as to enable over-riding for positive coarse pitch of the airscrew to be obtained at the high speed end of the quadrant.

It will be seen that the construction shown provides for fine airscrew pitch for starting and slow running, that is to say, by means of the protuberance $t^7$ on the cam $t^5$. Further, coarse airscrew pitch is provided for any position of the pilot's lever beyond the normal or starting position, that is to say, after the lever D has broken the seal $v^1$ in the case of emergency. In addition, the boost control device $E^1$ is positively overridden at small throttle openings and also in emergency conditions when the lever D has been moved to break the seal $v^1$.

This construction therefore not only overcomes difficulties which would otherwise be associated with, say, dive-bombing, slow running and acceleration, but also in the event of one engine of a multi-engine machine breaking down, positive coarse pitch of the airscrew $A^1$ may be obtained by the pilot irrespective of the governor control so that the drag of the "dead" engine will be reduced to a minimum. It will be understood that setting of coarse or fine airscrew pitch by the pilot's lever may be applied, say, in the manner described with reference to Figure 4, also to engines of the compression ignition type, say, as will be described with reference to Figure 6.

The supercharger H is driven through a change-speed gear and the ratio of this gear influenced by the pilot's lever through the cams $U^{10}$ and T on the shaft $K^4$. The cam T acts on a roller $T^1$ carried at one end of a floating lever $T^2$ connected to the spindle $T^3$ of a stack of evacuated capsules $T^4$ arranged within a chamber $T^5$ in open communication with the atmosphere through a pipe $T^6$. The stack of capsules $T^4$ acts on a piston valve $T^8$ which controls the supply of oil under pressure through a pipe $T^9$ to two pipes $U^1$ and $U^2$, and the discharge of oil from these pipes. The pipes $U^1$ and $U^2$ lead to a servo cylinder U on opposite sides of a servo piston $U^3$, this piston having a rod $U^4$ which controls a change-speed gear $U^{12}$ through which the engine drives the supercharger H. The piston $U^3$ is also connected, as shown, to a lever $U^5$ pivoted on a fixed part at $U^6$ and having a slot $U^7$ along which a pin $U^8$ is freely movable. The pin $U^8$ is carried at the lower end of a link $U^9$ connected to one end of the floating lever $S^{14}$, the other end of which acts on the spindle $E^3$ of the variable datum boost control in the manner described, the cam $U^{10}$ acts through a lever $U^{11}$ so that the pin $U^8$ is moved along the slot $U^7$ by adjustment of the pilot's lever D.

Surrounding the piston valve $T^8$ is a movable sleeve $T^{13}$ having ports which can expose or cut off the inlets to the tubes $U^1$ and $U^2$ according to the displacement of the sleeve $T^{13}$.

The sleeve $T^{13}$ is connected to the servo piston $U^3$ by bell crank levers $U^{13}$ and $U^{14}$ and interconnecting rods so that as the servo piston $U^3$ starts to descend the sleeve $T^{13}$ moves upwards and increases the port area to the tube $U^1$, causing the piston $U^3$ to descend rapidly and effect a quick change of gear ratio. The ports in the sleeve $T^{13}$ are so arranged that the change of gear ratio while ascending will take place at a slightly different altitude from that at which the ratio will be changed while descending.

Thus if for one engine speed the lever $T^2$ is set so that the gear ratio will be changed up at, say, 7,000 feet altitude, this gear ratio will be changed down automatically when descending, not at 7,000 feet altitude, but at, say, 6,500 feet. This avoids unnecessary gear changes and reduces the tendency for hunting which would be liable to occur if the pilot decided to fly for an appreciable time at the altitude of 7,000 feet referred to.

With the piston $U^3$ in the position shown in full lines the change-speed gear indicated at $U^{12}$ is set for a low super-charger speed whereas with the piston $U^3$ in its lowermost position as indicated by the dotted position of the lever $U^5$ the change-speed gear $U^{12}$ is set for a high supercharger speed.

If the change-speed control device $T^4$, $T^5$ were to operate the piston $U^3$ independently of the pilot's lever D the stack of capsules $T^4$ would always effect a gear change at a particular altitude. This is not, however, the most desirable condition and the pilot's lever D is therefore employed to vary the altitude at which the supercharger speed is automatically changed, at different engine speeds as hereinafter described with reference to Figure 5. Thus, when the pilot's lever D is operated the datum of the control device $T^4$, $T^5$ is altered so that the gear ratio of the supercharger is changed at different altitudes for each position of the pilot's lever D.

A further advantage of the mechanism shown is that it permits a change of boost pressure with change of the supercharger gear ratio, without any action on the part of the pilot. Thus, the lever $U^5$ acts through the pin $U^8$, link $U^9$ and lever $s^{14}$ to alter the datum of the boost control device $E^1$ whenever the supercharger gear ratio is changed. For the purpose of providing different changes of boost pressure at different speeds the cam $U^{10}$ alters the position of the pin $U^8$ in the slot $U^7$ so that the fixed travel of the servo piston $U^2$ will give a displacement in the datum of the boost control device $E^1$ in accordance with the position of the pilot's lever D.

It will be understood that movement of the servo piston $U^3$ could also be transmitted, say, through suitable link mechanism, to ignition-timing and mixture strength-control devices, and that the influence of the piston $U^3$ on these devices could be influenced in accordance with the speed, for example, by mechanism similar to the cam $U^{10}$ and the associated linkage.

For the purpose of controlling the supercharger gear ratio independently of the automatic apparatus, say under special circumstances or in emergency, the lever $T^2$ is carried on a bell crank lever $T^{10}$ mounted on a fixed pivot $T^{11}$ and under the control of the pilot through a rod $T^{12}$. Movement of the lever $T^{10}$ will tend to displace the piston valve $T^8$ and thus alter the altitude at which the ratio of the gear $U^{12}$ is changed. For example, when cruising at very high altitudes and a low output, it may suffice to operate the supercharger in low gear ratio. This may be accomplished by turning the lever $T^{10}$ in the clockwise direction so as to raise the valve $T^8$ and thus over-ride the normal operation of the control device $T^5$ to give a low supercharger speed. Usually this will result in improved economy of operation of the engine and for this reason the rod $T^{12}$ may be connected to the auxiliary control lever R. It will be seen that extreme movement of the lever $T^{10}$ in either direction will prevent normal operation of the device $T^5$ and thus positively set a high speed supercharger gear ratio or low speed supercharger ratio, in the case of a breakdown.

It will be understood that though in the construction above described the change-speed gear gives two speed ratios, means may be provided for giving three or more gear ratios. Interconnection with the pilot's lever may be provided whereby an automatic gear change will take place at the "ideal" altitudes with further interconnections which will provide for the varying boost pressures in the different supercharger gear ratios.

The apparatus ensures automatic change of the supercharger speed at the optimum altitude for each set of conditions, the boost control device controlling at different induction pressures in the two supercharger ratios.

This is illustrated by the curves shown in Figure 5 which indicate, by way of example, outputs obtainable from a power unit having a control system similar to that described with reference to Figure 4. The four curves $a$, $b$, $c$ and $d$ are plotted with altitudes in feet above sea level as abscissae and, as ordinates, percentages of the take-off output.

Considering the curve $a$, the pilot takes off at maximum boost pressure, say 1.4 atmospheres (absolute pressure), 100% power output and 1640 airscrew revolutions per minute. At approximately 1000 feet altitude the engine is throttled to a boost pressure of 1.275 atmospheres, the airscrew speed being reduced to approximately 1490 revolutions per minute as indicated at the right-hand end of the curve $a$. With this setting of the control mechanism the machine climbs with gradually increasing power, as shown by the part $a^1$ of the curve $a$, the power increase being approximately 1.1% per 1000 feet altitude. When an altitude of approximately 4900 feet is reached (point $a^2$) the throttle G is fully open and with further increase in altitude the boost pressure falls off below the initial climbing pressure of 1.275 atmospheres. The drop in power output, as indicated by the part $a^3$ of the curve, continues up to the point $a^4$, that is to say approximately 9900 feet altitude, when the power reduction is so serious that a change in the supercharger gear ratio is desirable. The change-speed control device now automatically changes the gear ratio of the supercharger and at the same time the displacement of the link $U^5$ alters the datum of the boost control device $E^1$ to give a boost pressure of 1.200 atmospheres. The output of the engine now increases as shown by the part $a^5$ of the curve $a$, the supercharger, in this high speed ratio, being capable of maintaining this boost pressure up to approximately 13,800 feet, corresponding to the point $a^6$ on the curve $a$ where full throttle is again attained. The output will then again commence to fall off, as shown by the part $a^7$ of the curve $a$, if the climb is continued to higher altitudes at the said engine speed, namely 1490 revolutions per minute.

Having attained his operational height the pilot may throttle his engine to the maximum power permissible for cruising, as shown by the curve $b$. From this curve it will be seen that the limits for cruising are set at 1300 airscrew revolutions per minute and 1.075 atmospheres boost pressure at low altitudes. Within the cruising speed range therefore the power output increases from approximately 68% of the take-off output, as shown by the part $b^1$ of the curve $b$ up to approximately 72% of the take-off output at 5900 feet, when the throttle is fully open, this corresponding to the point $b^2$ on the curve $b$. For altitudes above 6000 feet the power output falls, as shown by the part $b^3$ of the curve $b$ until an altitude of 10,800 feet, that is to say the point $b^4$ is attained.

The supercharger gear ratio is automatically changed at the point $b^4$ so that up to approximately 14,500 feet altitude the output again increases as indicated by the part $b^5$ of the curve $b$, the throttle being again fully open at the point $b^6$ after which the output falls off as shown by the part $b^7$. After the gear change at the point $b^4$ the boost pressure will be maintained at approximately 1.025 atmospheres up to the altitude of 14,500 feet so that at the maximum cruising speed range the difference between the boost pressure at the high and low ratios of the supercharger is 0.05 atmosphere as opposed to the difference of 0.075 in boost pressure obtained within the climbing range indicated by the curve $a$.

The curve $c$ indicates variations in the power output, and critical altitudes with reduced cruising speed, for example, as might be employed for economy in long range flying. From this curve it will be seen that the airscrew speed is approximately 1115 revolutions per minute and at low altitudes the output increases slightly from 50% of the take-off output at ground level, as shown by the part $c^1$ of the curve, to approximately 54% of this output at, say, 7800 feet altitude (point $c^2$) when the throttle is fully open. With increasing altitude the output falls off, as shown by the part $c^3$ of the curve, until approximately 11,700 feet altitude is attained, this corresponding to the point $c^4$ on the curve. The gear ratio of the supercharger is now changed automatically and the output again rises slightly as shown by the part $c^5$ of the curve up to an altitude of approximately 15,300 feet when the throttle is again fully open, this corresponding to the point $c^6$ on the curve. For higher altitudes at this reduced cruising speed range the power output again falls off as shown by the part $c^7$ of the curve $c$. It will be noted from this curve that the altitude at which the supercharger gear change takes place, i. e. the point $c^4$ at 11,700 feet, is higher than the altitude (approximately 10,800) at which the gear change takes place at the higher cruising speed indicated by the curve $b$. Moreover, the difference in the boost pressures at the two gear ratios of the supercharger at the reduced cruising speed, as indicated on the curve $c$, is 0.025 atmosphere, which is less than the difference above referred to, namely 0.05 atmosphere which is obtained by the gear change at the higher cruising speed indicated on the curve $b$.

In an emergency the pilot may fly level for a short period at high or "emergency" outputs as indicated by the curve $d$, the airscrew speed being approximately 1560 revolutions per minute. From this curve it will be seen that up to moderate altitudes the output rises from approximately 94% to the take-off output, i. e. 100%, as shown by the part $d^1$ of the curve $d$, the permissible boost pressure being approximately 1.350 atmospheres. Beyond approximately 4800 feet, the throttle is fully open at a point corresponding to the point $d^2$ of the curve $d$, and the power output falls off as shown by the part $d^3$ of the curve, until the point $d^4$, that is to say at an altitude of approximately 9700 feet. The gear ratio of the airscrew is now automatically changed and the output again rises as shown by the part $d^5$ of the curve, the boost pressure being maintained at approximately 1.275 atmospheres until, at 13700 feet (point $d^6$), the throttle is again fully open so that the power output again falls off, as shown by the part $d^7$ of the curve, with increasing altitude.

The three lines $e$, $e^1$ and $e^2$ represent critical altitudes in the engine performances at different airscrew speeds. The lines $e$ and $e^2$ represent the altitudes at which the throttle G will be fully open at different airscrew speeds, the line $e$ corresponding to low speed ratio of the supercharger gear whilst the line $e^2$ corresponds to high ratio of the supercharger gear.

The slope of the lines $e$ and $e^2$ and their curvature will depend on arbitrary selection of boost pressures and engine speeds and the fundamental interconnection of the pitch governor and boost control device. The line $e^1$ indicates the altitudes at which the supercharger ratio is automatically changed and would, in fact, be more accurately represented by two lines lying approximately parallel and with corresponding points spaced by a distance representing approximately 500 feet altitude since the lost motion device $T^7$ will automatically change the gear ratio at a higher altitude when ascending than when descending. Thus, the gear ratio will be automatically changed up at an altitude given by one of these lines and down at the corresponding altitude given by the other line. The desired inclination of the gear change line is obtained by the action of the cam T operated by the pilot's lever D, as described with reference to Figure 4.

Though in the two constructions above described the invention is applied to a power unit comprising an engine of the vapourised charge spark ignition type supplied with air by a supercharger, the invention is also applicable to power units of the type comprising an engine of the compression ignition type. Figure 6 illustrates by way of example, one arrangement of control apparatus according to the invention applied to a compression ignition engine. In this arrangement the pilot's lever D is connected to a main operating shaft $k$ having secured thereto a cam $k^1$ for controlling the pitch governor B, in a manner generally similar to that described with reference to Figure 4. The shaft $k$ also carries a cam $k^2$ which acts through a rocking lever $k^3$, link $k^4$ and lever $k^5$ on a piston valve $k^6$ of a servomotor or "copying device" $k^7$ similar in operation to the servomotor or "copying device" $o^5$ described with reference to Figure 4. The piston $k^8$ acts through mechanism $k^9$ on the fuel injection pumps $k^{10}$ which deliver fuel to the several cylinders of the engine, thereby controlling the mean effective pressure developed by the engine. The lower end of the lever $k^5$ is connected by a rod $l^1$ to one end of a stack of evacuated capsules $l^2$ arranged within a cylinder $l^3$ having a pipe $l^4$ communicating with the induction pipe of the engine. At altitudes where the induction pressure commences to fall, therefore, the stack of capsules $l^2$ will tend to reduce the quantity of fuel injected at each stroke by each of the pumps $k^{10}$.

The cam $k^2$ is so constructed that with the pilot's lever D in the starting position I (see Figure 1) a large fuel charge will be set for the fuel pump $k^{10}$. As the pilot's lever D is moved to increase the speed the cam $k^2$ will at first slightly decrease the quantity of fuel injected and will then commence to increase this quantity, though, within the cruising speed range, the quantity of fuel injected will be maintained within economy limits. For take-off, climbing or emergency positions of the pilot's lever respectively the quantity of fuel injected will be the maximum permissible for efficient combustion.

The timing of the fuel injection may be altered to suit the engine speed and output. To this end, the shaft $k$ is furnished with a cam $m$ which acts through a rocking lever $m^1$ on a servomotor or "copying device" $m^5$ similar in operation to the device $k^7$. The piston $m^6$ of this "copying device" $m^5$ is connected through a link $m^7$ to the cage $m^8$ of a differential gear $m^9$ through which the fuel pumps $k^{10}$ are driven from the engine. As the pilot's lever D is moved to increase the speed, the cam $m$ turns the bell crank lever $m^3$ in the clockwise direction as viewed in the drawing so that the piston $m^6$ is raised and the cage $m^8$ of the differential gear $m^9$ is angularly adjusted so as to advance the timing of the fuel injection.

The shaft $k$ also carries a cam E which through a servo control device $E^1$ of the kind shown in Figures 1 and 4 operates a throttle G in the inlet pipe of the supercharger H to vary the quantity of air admitted to the supercharger in accordance with the pressure in the induction pipe of the engine.

A cam $n$ actuated by the connection between the pilot's lever and the airscrew pitch governor B controls a change-speed gear between the engine and the airscrew in the manner described with reference to Figure 1.

It will be understood that an arrangement similar to that described with reference to Figude 6 may also be applied for the control, in accordance with the invention, of an engine of the spark ignition type employing fuel injection instead of a carburettor.

It will therefore be seen that with the present invention power output increases progressively with movement of the pilot's lever towards opening of the throttle, but that such increase of output takes place at different and predetermined rates according to the stage through which the pilot's lever is moved. Further, with the interconnected or "common" control according to the invention the take-off engine speed may be allowed to rise to the desired value while the induction pressure is automatically determined, for each speed, to the value appropriate to the required power output. Again, since the several values, i. e. fuel supply, ignition timing, boost pressure and propeller pitch, may all be controlled by the pilot from a single master control device, a multiplicity of rods, wires or the like passing from the engine to the cock-pit is avoided. Since the individual control devices may all constitute a part of or may be mounted on the engine, a single control transmission rod or the like between the engine and cock-pit will serve to control all the said devices.

Though in all the arrangements described and illustrated the control forces are transmitted through mechanical and hydraulic means, it will be understood that the control forces may, where desired, be transmitted through electrical means. Similarly any suitable form of pitch governor and pitch control mechanism may be employed. For example, the pitch governor may be of the electrical type. The ratio of variation of boost pressure, ignition timing and the speed ranges over which such variations take place may vary with different power units.

What we claim as our invention and desire to secure by Letters Patent is:

1. An aircraft power unit comprising in combination an internal combustion engine, a variable pitch airscrew driven thereby, a governor controlling the airscrew pitch so as to govern the engine speed, a regulating device responsive to the induction pressure of the engine and adapted to control the said pressure and the fuel input to the engine, means for varying the ratio of fuel and air supplied to the engine, a master control device under the control of the pilot for simultaneously effecting the appropriate adjustments of engine speed and torque required for various conditions of flight, and interconnecting means between the master control device, the pitch governor, the regulating device and the means for varying the fuel/air ratio.

2. An aircraft power unit comprising in combination an internal combustion engine, a variable pitch airscrew driven thereby, a governor controlling the airscrew pitch so as to govern the engine speed, a throttle, a regulating device responsive to the induction pressure of the engine and adapted to move the said throttle to control the said pressure and the fuel input to the engine, a master control device under the control of the pilot for simultaneously effecting the appropriate adjustments of engine speed and torque required for various conditions of flight, interconnecting means between the master control device, the regulating device, the pitch governor and the throttle and means for permitting movement of the master control device after the throttle has been moved to its fully open position.

3. An aircraft power unit comprising in combination an internal combustion engine, a variable pitch airscrew driven thereby, a governor controlling the airscrew pitch so as to govern the engine speed, a regulating device responsive to the induction pressure of the engine and adapted to control the said pressure and the fuel input to the engine, a master control device under the control of the pilot for simultaneously effecting the appropriate adjustments of engine speed and torque required for various conditions of flight, interconnecting means between the master control device, the pitch governor and the regulating device, and means whereby movement of the master control device from a starting position through a "first stage" and tending to increase the input to the engine is at first substantially ineffective on the regulating device and pitch governor, whereas the continued movement of the master control device through this stage influences the regulating device and the governor towards an increase in the engine speed, movement of the master control device through a "second stage" causes the regulating device to increase the induction pressure with simultaneous but relatively small increase in the engine speed and movement of the master control device through a "third stage" causes the engine speed to be increased with little, if any, change in the induction pressure.

4. An aircraft power unit comprising in combination an internal combustion engine of the spark ignition type, a variable pitch airscrew driven thereby, a governor controlling the airscrew pitch so as to govern the engine speed, a regulating device responsive to the induction pressure of the engine and adapted to control the said pressure and the fuel input to the engine, means for regulating the timing of the ignition, a master control device under the control of the pilot for simultaneously effecting the appropriate adjustments of engine speed and torque required for various conditions of flight, interconnecting means between the master control device, the pitch governor, the pressure regulating device and the means for regulating the timing of the ignition, and means whereby movement of the master control device from a starting position through a "first stage" and tending to increase the input to the engine is at first substantially ineffective on the pressure regulating device, the pitch governor and the ignition timing regulating device, whereas continued movement of the master control device through this stage actuates the pressure regulating device and the governor towards an increase in the engine speed and at the same time rapidly advances the timing of the ignition, movement of the master control device through a "second stage" causes the rate of ignition advance to be decreased and then causes the ignition to be retarded and the pressure regulating device to increase the induction pressure with a simultaneous but relatively small increase of the engine speed and movement of the master control device through a "third stage" causes the engine speed to be increased with little, if any, change in the induction pressure and ignition timing.

5. An aircraft power unit comprising in combination an internal combustion engine, a variable pitch airscrew driven thereby, a governor controlling the airscrew pitch so as to govern the engine speed, a regulating device responsive to the induction pressure of the engine and adapted to control the said pressure and the fuel input to the engine, means for regulating the ratio of fuel and air supplied to the engine, a master control device under the control of the pilot for simultaneously effecting the appropriate adjustment of engine speed and torque required for various conditions of flight, interconnecting means between the master control device, the pitch governor, the pressure regulating device and the fuel/air ratio regulating means, and means whereby movement of the master control device from a starting position through a "first stage" and tending to increase the input to the engine is at first substantially ineffective on the pressure regulating device and the pitch governor while causing the ratio of fuel to air to be increased for starting and slow running speeds, whereas continued movement of the master control device through this stage causes the ratio of fuel to air to be decreased and actuates the boost pressure regulating device and governor towards an increase in engine speed, movement of the master control device through a "second stage" causes the ratio of fuel to air to be gradually increased, and increases the induction pressure with simultaneous but relatively small increase of the engine speed, and movement of the master control device through a "third stage" causes the ratio of fuel to air to be increased more rapidly and the engine speed to be increased with little, if any, change in the induction pressure.

6. An aircraft power unit comprising in combination an internal combustion engine of the spark ignition type, a variable pitch airscrew driven thereby, a governor controlling the airscrew pitch so as to govern the engine speed, a regulating device responsive to the induction pressure of the engine and adapted to control the said pressure and the fuel input to the engine, means for varying the timing of the ignition, means for regulating the ratio of fuel and air supplied to the engine, and a master control device under the control of the pilot for simultaneously effecting the appropriate adjustments of engine speed and torque required for various conditions of flight, interconnecting means between the master control device, the pitch governor, the regulating device, the ignition control and the means for regulating the fuel/air ratio, and means separate from the master control device for simultaneously advancing the ignition timing and decreasing the ratio of fuel to air supplied to the engine.

7. An aircraft power unit comprising in combination an internal combustion engine of the spark ignition type, a variable pitch airscrew driven thereby, a governor controlling the airscrew pitch so as to govern the engine speed, a regulating device responsive to the induction pressure of the engine and adapted to control the said pressure and the fuel input to the engine, means for regulating the ignition timing, means for regulating the timing of the ignition automatically in accordance with the altitude, a master control device under control of the pilot for simultaneously effecting the appropriate adjustments of engine speed and torque required for various conditions of flight, and interconnecting means between the master control device, the pitch governor, the pressure regulating device and the means for regulating the ignition timing.

8. An aircraft power unit comprising in combination an internal combustion engine, a variable pitch airscrew driven thereby, a governor controlling the airscrew pitch so as to govern the engine speed, a supercharger for supplying air to the engine, a change speed gear through which the supercharger is driven by the engine, a regulating device responsive to the induction pressure of the engine and adapted to control the said pressure and input to the engine, a change speed control device whereby the ratio of the change speed gear is automatically changed at predetermined altitudes, a master control device under the control of the pilot for simultaneously effecting the appropriate adjustments of engine speed and torque required for various conditions of flight, and interconnecting means between the master control device, the pitch governor, the pressure regulating device and the change speed control device.

9. An aircraft power unit comprising in combination an internal combustion engine, a variable pitch airscrew driven thereby, a governor controlling the airscrew pitch so as to govern the engine speed, a supercharger for supplying air to the engine, a change speed gear through which the supercharger is driven from the engine, a change speed control device whereby the ratio of the said gear is automatically changed at predetermined altitudes, a regulating device responsive to the induction pressure of the engine and adapted to control the said pressure and the fuel input to the engine, means whereby the pressure regulating device is controlled in accordance with the gear ratio set by the change speed gear control device, a master control device under the control of the pilot for simultaneously effecting the appropriate adjustments of engine speed and torque required for various conditions of flight, and interconnecting means between the master control device, the pitch governor and the pressure regulating device.

10. An aircraft power unit comprising in combination an internal combustion engine, a variable pitch airscrew driven thereby, a governor controlling the airscrew pitch so as to govern the engine speed, a supercharger for supplying air to the engine, a change speed gear through which the supercharger is driven from the engine, a change speed control device whereby the ratio of the said gear is automatically changed at predetermined altitudes, a regulating device responsive to the induction pressure of the engine and adapted to control the said pressure and the fuel input to the engine, a master control device under the control of the pilot for simultaneously effecting the appropriate adjustments of engine speed and torque required for various conditions of flight, interconnecting means between the master control device, the pitch governor and the pressure regulating device, and means whereby the altitude at which the ratio of the gear is changed when the craft is ascending is caused to differ from the altitude at which the ratio of the gear is changed when the craft is descending.

11. An aircraft power unit comprising in combination an internal combustion engine, a variable pitch airscrew driven thereby, a governor controlling the airscrew pitch so as to govern the engine speed, a supercharger driven by the engine and supplying air thereto, a change speed gear through which the supercharger is driven from the engine, a change speed control device whereby the ratio of the said gear is automatically changed at predetermined altitudes, a regulating device responsive to the induction pressure of the engine and adapted to control the said pressure and the fuel input to the engine, a master control device under the control of the pilot for simultaneously effecting the appropriate adjustments of engine speed and torque required for various conditions of flight, interconnecting means between the master control device and the change speed gear control device, and overriding control means whereby the ratio of the change speed gear can be altered by the pilot independently of the automatically operating change speed control device.

12. An aircraft power unit comprising in combination an internal combustion engine, a variable pitch airscrew, a change speed gear through which the airscrew is driven from the engine, a change speed control device for altering the ratio of the change speed gear, a governor controlling the airscrew pitch so as to govern the engine speed, a regulating device responsive to the induction pressure of the engine and adapted to control the said pressure and the fuel input to the engine, a master control device under the control of the pilot for simultaneously effecting the appropriate adjustments of engine speed and torque required for various conditions of flight, and interconnecting means between the master control device, the pitch governor, the change speed control device and the regulating device, and means whereby movement of the master control device to increase the engine speed beyond a given value causes the ratio of the said gear to be changed so as to increase the ratio of the airscrew speed with respect to the engine speed.

13. An aircraft power unit comprising in combination an internal combustion engine, a variable pitch airscrew driven thereby, a governor controlling the airscrew pitch so as to govern the engine speed, a regulating device responsive to the induction pressure of the engine and adapted to control the said pressure and the fuel input to the engine, a master control device under the control of the pilot for simultaneously effecting the appropriate adjustments of engine speed and torque required for various conditions of flight, interconnecting means between the master control device, the pitch governor, and the regulating device, and overriding means whereby in certain positions the master control device positively sets the airscrew pitch irrespective of the automatic pitch control.

14. An aircraft power unit comprising in combination an internal combustion engine, a variable pitch airscrew driven thereby, a governor controlling the airscrew pitch so as to govern the engine speed, a regulating device responsive to the induction pressure of the engine and adapted to control the said pressure and the fuel input to the engine, a master control device under the control of the pilot for simultaneously effecting the appropriate adjustments of engine speed and torque required for various conditions of flight, interconnecting means between the master control device, the pitch governor and the regulating device, and means whereby fine airscrew pitch is maintained by the master control device while this is in its starting position irrespective of the automatic pitch control.

15. An aircraft power unit comprising in combination an internal combustion engine, a variable pitch airscrew driven thereby, a governor controlling the airscrew pitch so as to govern the engine speed, a regulating device responsive to the induction pressure of the engine and adapted to control the said pressure and the fuel input to the engine, a master control device under the control of the pilot for simultaneously effecting the appropriate adjustments of engine speed and torque required for various conditions of flight, interconnecting means between the master control device, the pitch governor and the regulating device, and means whereby a coarse airscrew pitch is set irrespective of the automatic pitch control by movement of the master control device out of its normal range of movement.

FRANK BERNARD HALFORD.
ERIC STANLEY MOULT.